Aug. 31, 1965  A. P. STEIN  3,203,235
TENSIOMETER
Filed Feb. 7, 1963
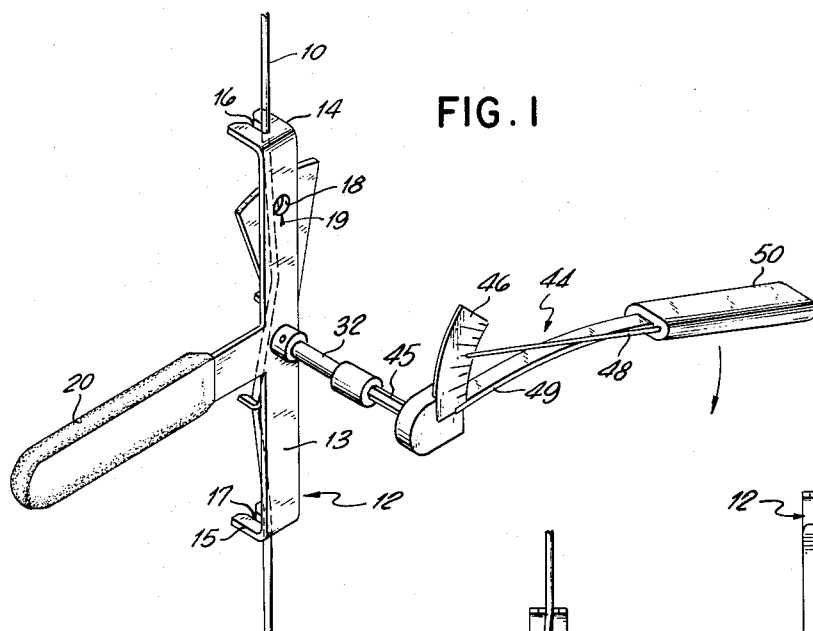
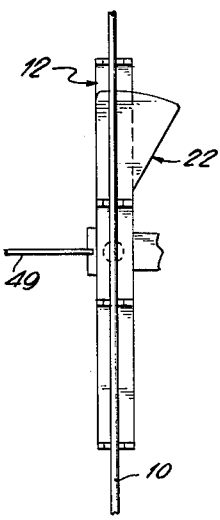
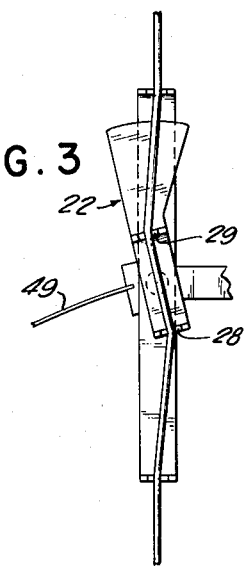
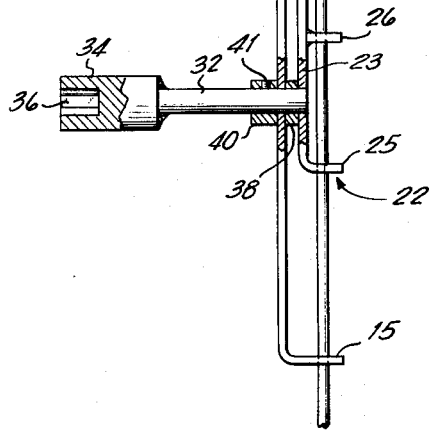
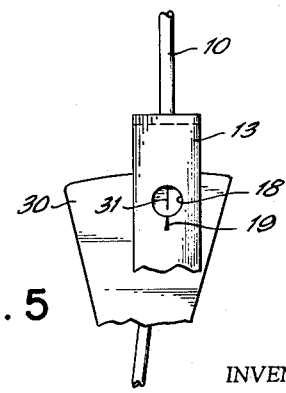
INVENTOR.
ARNOLD P. STEIN
BY Samuel J. Snyder
ATTORNEY

United States Patent Office 3,203,235
Patented Aug. 31, 1965

3,203,235
TENSIOMETER
Arnold P. Stein, Silver Spring, Md., assignor to ACF Industries, Incorporated, New York, N.Y., a corporation of New Jersey
Filed Feb. 7, 1963, Ser. No. 256,855
4 Claims. (Cl. 73—144)

This invention relates to a tensiometer for measuring the tension of a cable, rope, or the like.

The common procedure for measuring the tension of a cable is to provide a removable link which is disassembled to permit a dynamometer to be connected between the cable ends to measure the tension.

It is an object of the present invention to provide an inexpensive device which can be quickly placed over a taut cable to measure the tension in the cable, without opening or disassembling the cable. It is an advantage of the present invention that it is a unitary device which can be operated without any accessory equipment. A wide range of tensions can be measured by the simple expedient of using a set of torque wrenches and merely inserting the required torque wrench in a socket of the device.

Further objects and advantages of the invention will become apparent from the following description and the accompanying drawing wherein:

FIG. 1 is a perspective view of a tensiometer according to the invention.

FIGS. 2 and 3 are partial rear views showing the tensiometer in two operating positions.

FIG. 4 is a side view of the apparatus.

FIG. 5 is a partial front view showing the means for indicating a given lateral displacement of the cable.

Referring to the drawing, there is shown a taut cable 10 the tension of which is to be measured. The tensiometer includes a U-shaped member 12 having a bar 13 extending along the cable. The bar 13 has bent ends or clevises 14 and 15 provided with slot 16 and 17 for receiving the cable. Bar 13 is also provided near one end with a viewing hole 18 and an index 19, the purpose of which will be explained later. A handle 20 extends laterally from the middle of bar 13.

Another member 22 includes a bar 23 and clevises 25 and 26 similar to clevises 14 and 15 and having slots 28 and 29 for receiving the cable. Extending upwardly from clevis 26 is a wing-shaped member 30 provided with an index 31 which can be seen through the opening 18 when member 22 is turned through a predetermined angle. Midway between clevises 25 and 26, shaft 32 is welded to bar 23 and extends through bar 13. Shaft 32 is provided with a head 34, having a hexagonal socket 36. The member 22 is spaced from bar 13 by washer 38, and collar 40 is fastened to shaft 32 by set screw 41 for holding members 12 and 22 in proper juxtaposition.

Torque wrench 44 has a hexagonal rod 45 adapted to be inserted in socket 36. The torque wrench may be of any suitable type, and has a dial 46 and pointer 48 for indicating the torque applied, and a bar 49 and handle 50. In one embodiment of the invention adapted for measuring tensions of the order of 100 pounds in a ⅛" cable, the torque wrench had a range of 0 to 150 inchpounds. As indicated above, a plurality of interchangeable torque wrenches having different ranges may be provided and a suitable one of these wrenches inserted in socket 36.

To make a measurement of the tension of cable 10, the tensiometer is placed on the cable so that the latter passes through clevises 14 and 15 and also clevises 25 and 26. Handle 20 is grasped by one hand to hold member 12 in a fixed position, and handle 50 is grasped by the other hand. Members 12 and 22 are then in the positions shown in FIG. 2. Torque is then applied to the cable by pressing on handle 50 to turn member 22 relative to member 12 until mark 31 is seen through viewing hole 18 to be in alignment with index 19. The cable is then twisted into the condition shown in FIG. 3. The torque then indicated on dial 46 by pointer 48 is noted. The measured torque can be converted to tension of the cable by a calibration chart. In one model of the invention, for example, a torque of 70 inch-pounds applied to a ⅛" cable corresponded to a tension of 80 pounds, and a torque of 85 inch-pounds corresponded to a tension of 100 pounds.

Many modifications and variations of the invention will be apparent to those skilled in the art, in the light of the present disclosure. It is, therefore, to be understood that within the scope of the appended claims the invention may be practiced otherwise than as specifically described.

What is claimed is:

1. A device for measuring the tension of a cable or the like comprising
  (a) first means for engaging said cable at two first points thereof spaced a given distance from each other,
  (b) second means for engaging the cable at two spaced second points thereof normally aligned with and intermediate the first points and at substantially equal distances from the midpoint between the first two points of the cable, said second means being pivotally mounted on said first means at said midpoint,
  (c) third means connected to said second means for applying a torque to said second means to turn the second points of the cable about the midpoint and for measuring said torque,
  (d) and means for indicating a given angular displacement of the second points relative to the first points, whereby the tension of the cable is determined by the measured torque.

2. A device according to claim 1, wherein said first means for engaging the cable at said first points includes a member having a handle extending laterally therefrom.

3. A device according to claim 1, wherein said third means includes a torque wrench.

4. A device according to claim 3, wherein
  (a) said first means includes a bar adapted to extend along the cable and a clevis on each end of the bar adapted to span the cable,
  (b) and said second means includes a second bar parallel to the first mentioned bar and clevises on said bar adapted to be aligned with the first mentioned clevises.

References Cited by the Examiner
UNITED STATES PATENTS 2,013,938  9/35  Williams _____ 73—139
2,401,876  6/46  Marker et al. _____ 73—139
2,428,379  10/47  Naumann _____ 73—144

RICHARD C. QUEISSER, Primary Examiner.
DAVID SCHONBERG, Examiner.